(12) United States Patent  (10) Patent No.: US 8,347,708 B2
Hakansson et al.  (45) Date of Patent: *Jan. 8, 2013

(54) FLUID METER

(75) Inventors: Marie Hakansson, Limhamn (SE); Bengt I. Larsson, Skivarp (SE)

(73) Assignee: Dresser, Inc., Addison, TX (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/900,138

(22) Filed: Oct. 7, 2010

(65) Prior Publication Data

US 2011/0100117 A1 May 5, 2011

(30) Foreign Application Priority Data

Oct. 7, 2009 (EP) .................................... 09012704

(51) Int. Cl.
*G01F 3/14* (2006.01)
(52) U.S. Cl. ......................................................... 73/247
(58) Field of Classification Search .................. 73/247, 73/248
See application file for complete search history.

(56) References Cited

U.S. PATENT DOCUMENTS

| 1,882,632 | A | 10/1932 | Jaworowski |
| 2,113,526 | A | 4/1938 | Wydler |
| 2,198,759 | A | 4/1940 | Cadet |
| 2,257,590 | A | 9/1941 | Brouse |
| 2,756,726 | A | 7/1956 | Ainsworth |
| 3,159,030 | A | 12/1964 | Maginnis |
| 4,526,032 | A | 7/1985 | Huester |
| 5,648,606 | A | 7/1997 | Spalding |
| 5,686,663 | A | 11/1997 | Spalding |
| 5,811,676 | A | 9/1998 | Spalding |
| 2007/0154332 | A1 | 7/2007 | Larsson |

FOREIGN PATENT DOCUMENTS

| GB | 790 522 A | 2/1958 |
| WO | WO 98/49530 | 11/1998 |

OTHER PUBLICATIONS

U.S. Appl. No. 12/900,084, Hakansson, filed Oct. 7, 2010.*
Extended European Search Report for EP Application No. 09012702.8 dated Jan. 27, 2010, 4 pages.
Extended European Search Report for EP Application No. 09012703.6 dated Jan. 22, 2010, 5 pages.
Extended European Search Report for EP Application No. 09012704.4 dated Jan. 22, 2010, 5 pages.

* cited by examiner

*Primary Examiner* — Jewel V Thompson
(74) *Attorney, Agent, or Firm* — Woodcock Washburn LLP

(57) ABSTRACT

A multiple piston type fluid meter is disclosed having a first connecting rod and a second connecting rod that are integral with their respective pistons. A multiple fluid meter assembly comprising at least two fluid meters, and a fuel dispensing unit comprising a fluid meter or multiple fluid meters are also disclosed.

28 Claims, 6 Drawing Sheets

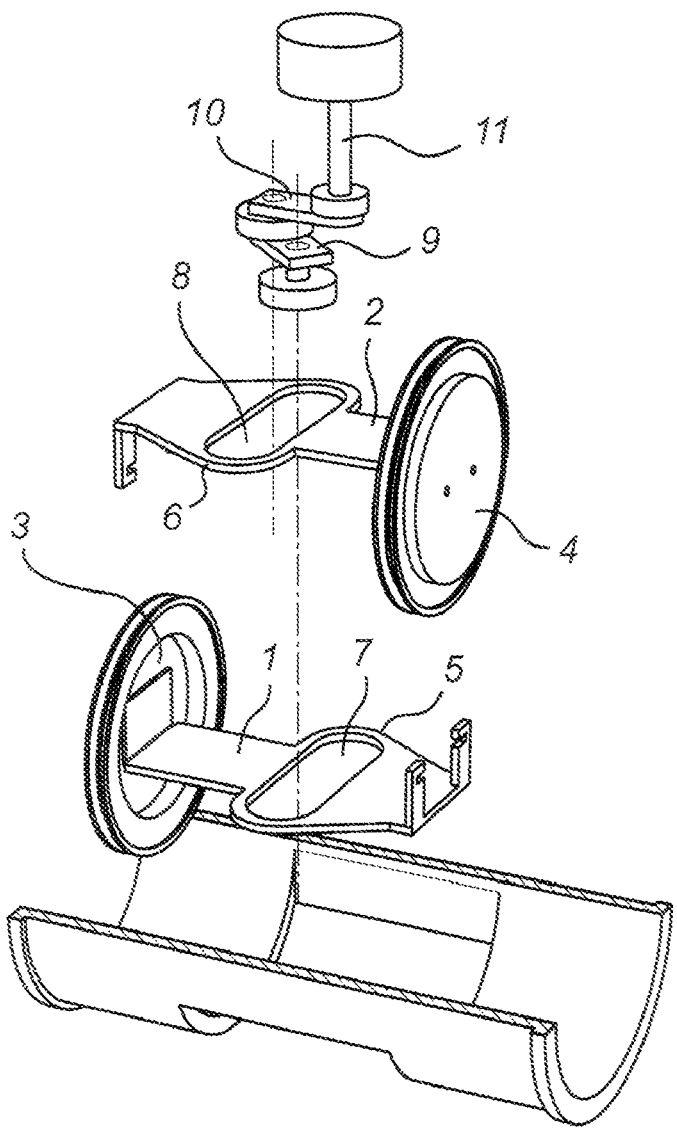
(Prior art) *Fig. 1a*
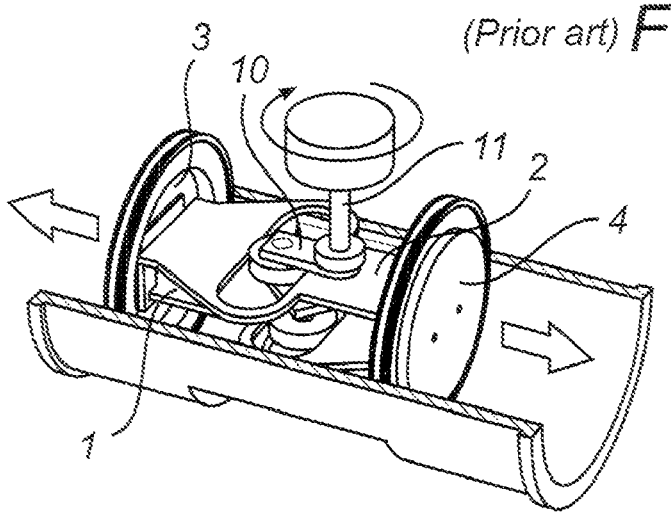
(Prior art) *Fig. 1b*

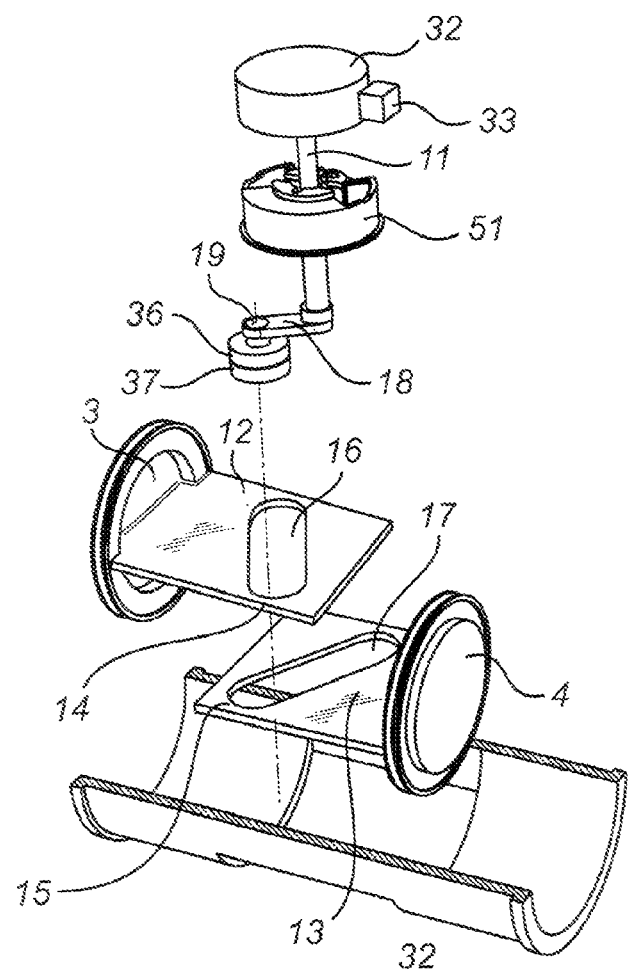
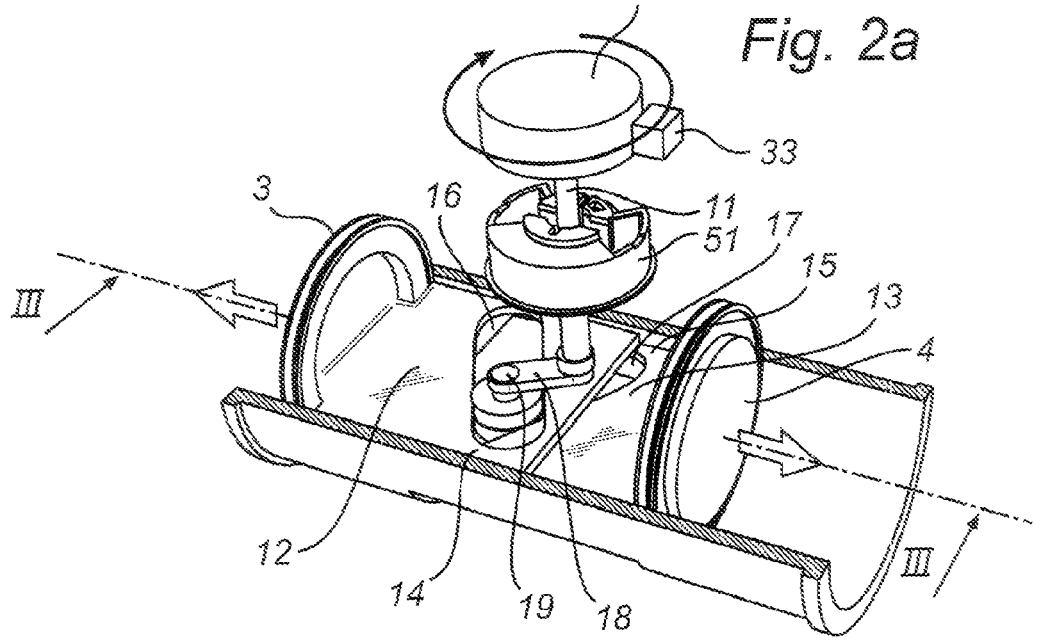
Fig. 2a
Fig. 2b

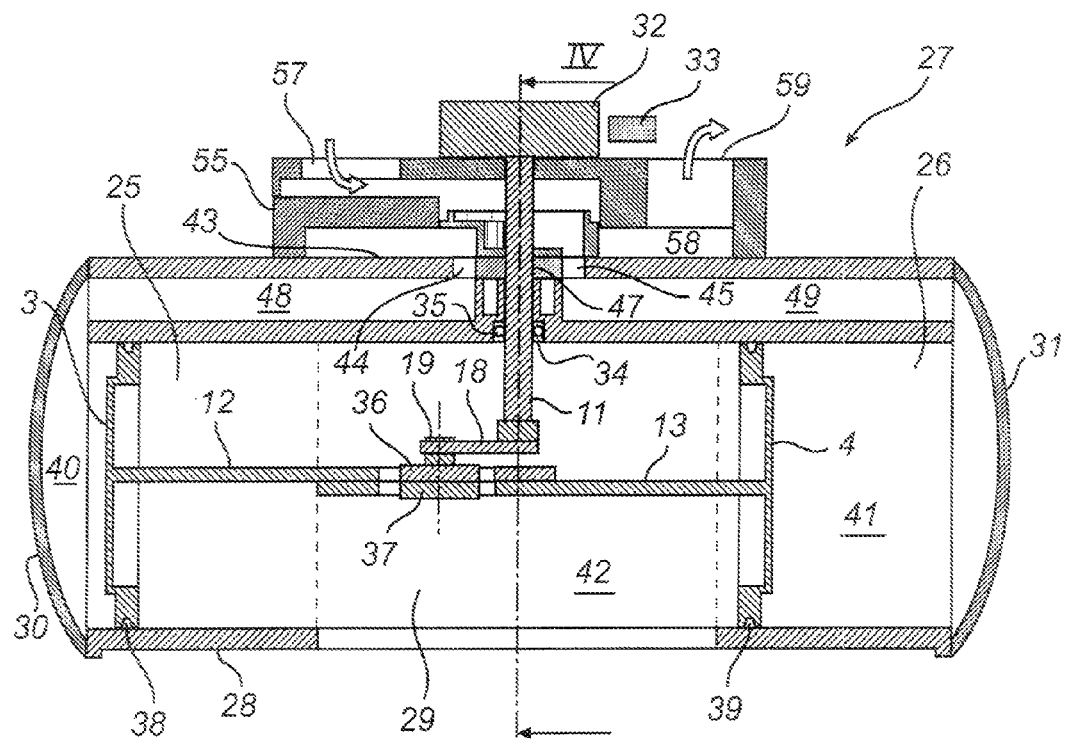
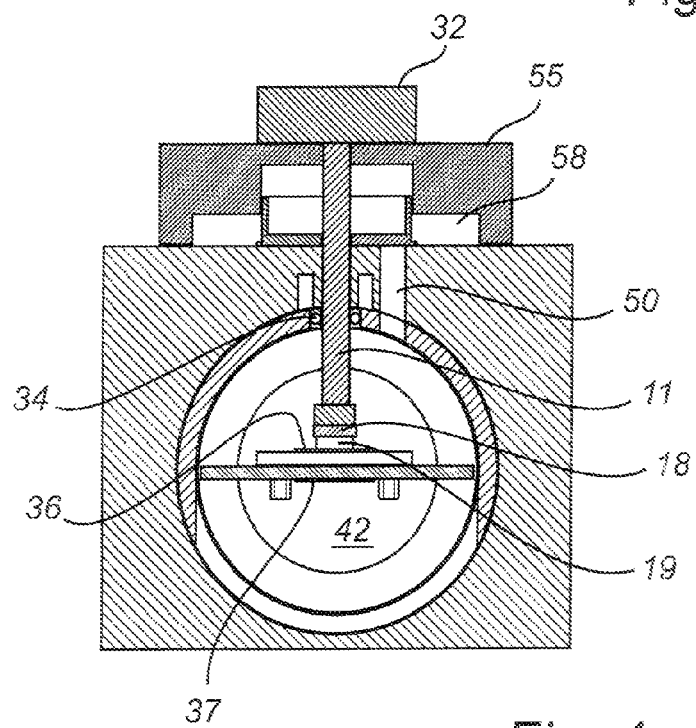

FLUID METER

CLAIM OF PRIORITY

Under 35 U.S.C. §119, this application claims the benefit of a foreign priority filed in the European Patent Office, serial number 09012704.4, filed Oct. 7, 2009, the entire contents of which are hereby incorporated by reference.

TECHNICAL FIELD

The present invention relates generally to fluid meters for volume measurement of a flowing fluid. More particularly, the present invention relates to multiple piston type fluid meters.

BACKGROUND ART

Fluid meters are widely used for most kinds of fluids in different application areas. Fluid meters are, for example, used in fuel dispensing pumps for retail sale of motor fuel, providing a means for measuring the quantity dispensed from the pump. The measured volume is typically communicated to a register, displaying the dispensed volume and the price.

A fluid meter commonly used for fuel dispensers is shown by Ainsworth, U.S. Pat. No. 2,756,726. In this disclosure, a meter having a multiple piston hydraulic motor is used. Fluid is allowed to enter cylinders and cause reciprocation of the pistons. The pistons are connected to a shaft, that will rotate as an effect of the reciprocation. A rotary valve, coupled to the shaft, admits liquid to the cylinders or permits flow to the outlet connections, in proper timed relation. The fluid meter utilizes what may be termed "hypothetical" cylinders, mechanically and hydraulically cooperating with the cylinders and pistons which are structurally existent.

This is accomplished by arranging the ports and the rotary valve so as to sequentially admit fluid to both the crankcase and the ends of the cylinders at the same time as fluid is withdrawn from the cylinders. The fluid volume admitted to, or withdrawn from, the crankcase is the algebraic sum of the volume withdrawn from, or admitted to, the cylinders. Two pistons, actuated through the valve mechanism, advantageously 120 degrees out of phase, thus perform the work equivalent of three pistons. This reduces the actual number of cylinders required for a given capacity, reduces internal friction and pulsation, and achieve smoother operation. The two pistons are attached via connecting rods to a crankshaft with a radially offset crank pin. The crank pin engages a yoke slot in each connecting rod so that the reciprocating movement of the two pistons is transformed into a rotary motion of the crankcase in accordance with the Scotch Yoke type principle. To accomplish the phase differences between the pistons, the two physical cylinders are oriented with an angle of 120 degrees between their respective center axis.

The Ainsworth fluid meter has several drawbacks, as, e.g., the requirement of special piston guide barrels, the arrangement of cylinders and guide barrels is relatively difficult to mould or cast and machine, and the register is driven by a shaft extending through the meter housing with accompanying risk of leakage.

A similar fluid meter is disclosed by Spalding, U.S. Pat. No. 5,686,663 and WO 98/49530. This fluid meter aims at eliminating the drawbacks of the Ainsworth fluid meter. Thus, the two angled cylinders of Ainsworth are aligned along a common center axis to eliminate the bulky construction of Ainsworth. To accomplish the same piston reciprocity, the crankshaft is modified with an extra crank arm. The in-line construction is advantageous when several meters have to be mounted in one dispenser, which is the normal case in most modern fuel dispensers.

The Spalding fluid meter, however, is not without some drawbacks. The large number of components makes the fluid meter difficult to assemble and thus relatively expensive to produce. Each component in the fluid meter that has to be connected to other components indicate an extra instance in the assembly procedure. Each assembling instance is a quality risk and will induce extra cost.

The Spalding fluid meter has further drawbacks. To achieve the correct phase difference between the operation of the cylinders, the crankshaft requires a complicated structure with two crank arms and two crank pins. The angle between the crank arms is crucial, which further complicates the manufacturing process. Since the crankshaft has many parts, as a result of the necessity of two crank arms, the crankshaft will also be less robust with increased risk of damage and resulting service.

SUMMARY OF THE INVENTION

In one or more of the embodiments disclosed herein, a fluid meter comprises a housing defining at least one crankcase and two cylinders, a crankshaft disposed in the crankcase, two pistons respectively mounted in the cylinders for reciprocal movement, a first connecting rod connected to one of the pistons and to the crankshaft for rotating the crankshaft in response to the movement of the one piston, and a second connecting rod connected to the other piston and to the crankshaft for rotating the crankshaft in response to the movement of the other piston, wherein the first and second connecting rods have yoke slots for receiving a crank pin.

In one or more of the embodiments disclosed herein, the fluid meter is characterised in that the first connecting rod and the second connecting rod are integral with their respective pistons.

In one or more of the embodiments disclosed herein, it is advantageous to produce the piston and connecting rod in one piece, i.e., integral, to minimize the number of components and to make the integral component more robust. In one or more of the embodiments disclosed herein, the integral piston and connecting rod, in one or more embodiments, can be used with piston fluid meters of any kind that use slotted yokes, e.g., according to the Scotch Yoke principle. The integral piston and connecting rod according to the invention can thus be used in piston fluid meters with axially-aligned cylinders and in piston fluid meters having angled cylinders as, e.g., the fluid meter according to the prior art of Ainsworth.

The integral rods and pistons may be made of a material selected from the group consisting of: plastic, metal, ceramic, and composite materials. It may be preferable that the integral pistons and connecting rods with their yokes are molded in one piece. The molding process of said integral piece ensures a very precise shape of the yoke slots which may be essential for some embodiments. Molding is also a simple and cheap process, minimizing manufacturing costs.

In one or more of the embodiments disclosed herein, the connecting rods are connected to the crankshaft by one common crank pin that is radially offset from the crankshaft; the two cylinders are axially-aligned, an axis through the endpoints of the yoke slot of one connecting rod forms an angle alpha with the alignment axis of the two axially aligned cylinders, and an axis through the endpoints of the yoke slot of the other connecting rod forms another, different angle beta with said alignment axis, so that the corresponding pistons reciprocate out of phase.

Using yoke slots that extend along a straight line between the endpoints of the yoke slot is, typically, the easiest way to generate piston movement with a motion speed following a harmonic sinus shape. It should however be noted that other shapes of the yoke slots could be used, e.g., where the yoke is bent along a suitable curve. The design of the inlet/outlet valve of the fluid meter casing could, e.g., require a special reciprocating piston movement, invoked by the yoke slots, to match its design.

In one or more of the embodiments disclosed herein, the settings of the yoke slots are arranged so as to cause the pistons to reciprocate out of phase even though the cylinders are aligned along the same center axis. Using normal transversal yoke slots, such as in the Spalding patent described above, two crank arms are necessary to achieve piston movements that are out of phase in such a geometry. Using the yoke slots disclosed in one or more embodiments herein, only one crank arm is necessary. There are several benefits of using only one crank arm for the movement of the pistons. The number of components are reduced, which may lead to reduced material costs. The manufacturing procedure may be simplified, leading to cheaper production costs. One single crank arm instead of two may lead to a crankshaft assembly that is a more robust and rigid unit. Further, the problem of providing the correct angle between two crank arms is eliminated as there is only one crank arm.

In one or more of the embodiments disclosed herein, each one of the yoke slots of said two connecting rods is adapted to extend along a straight line between said endpoints. As mentioned above, this is the easiest way to generate piston movement with a motion speed following a harmonic sinus shape and is therefore preferred at present.

In one or more of the embodiments disclosed herein, the angles alpha and beta are chosen so that the pistons reciprocate approximately 60° out of phase.

In one or more of the embodiments disclosed herein, the yokes reciprocate approximately 60° out of phase to achieve a smooth operation of the fluid meter. To be able to construct the housing in a simple and fairly symmetric manner, a phasing of the pistons 60° out of phase together with a proper inlet/outlet valve design and a geometry where the cylinders are directed away from each other, i.e., 180° angled from one another, will allow the fluid flow to enter and exit the two cylinders and the "hypothetical" cylinder in the crankcase, i.e., in between the reciprocating pistons, one by one, in a smooth motion with a phase offset by 120° between the operation of the cylinders.

In one or more of the embodiments disclosed herein, the angle alpha of the yoke slots of the fluid meter is less than 90° and the angle beta is more than 90°. More preferably alpha is approximately 60° and beta is approximately 120°. The latter angle setting will cause the pistons to reciprocate 60° out of phase and the operation of the cylinders will thus be 120° out of phase as typically preferred due to the 180° angle between the two physically existing cylinders.

Another advantage that may be achieved by use of oblique settings of the yoke slots, preferably with angles as described above, is that manufacturing of the fluid meter is simplified. Not only may the crankshaft be simpler, having only one crank arm and one crank pin, but the setting of the angles creating the out-of-phase piston movements may be made in the manufacturing process of the yoke slots instead of in the mounting of two crank arms on the crankshaft as in the prior art of Spalding. Accurate and precise formation of the yoke slots is fairly simple to achieve. The integral yoke and slot parts can, e.g., be manufactured by molding, ensuring a precise shape of the component.

In certain embodiments, it is preferred that a portion of one connecting rod engage the other connecting rod to support and guide the other connecting rod during movement. This can, e.g., be achieved through each connecting rod having a pair of guide tabs engaging the opposed side edge portions of the other connecting rod.

To guide the connecting rods in the manner described has the advantage of ensuring that the rods move in parallel to each other without deviation from the center axis of the cylinder. It is further not necessary to have yokes that extend in the full width of the cylinder, when guiding the connecting rods in one another. Such yokes with reduced width lead to reduction or avoidance of friction to the cylinder walls, which is advantageous not only for simplifying the operation of the connecting rods and their respective yokes, but also to reduce damages to the cylinder walls. If the walls are scratched or damaged in any way by the yokes, the piston ring gaskets will eventually not be able to seal the cylinders from the crank case as needed.

In certain embodiments, it is further preferred to provide a fluid meter of the above type where ports are defined in the housing in communication with the cylinders and the crankcase, and further comprising a port valve mounted on the crankshaft for rotation therewith and having a plurality of ports for sequentially registering with the ports in the housing for distributing fluid into and from the cylinders and the crankcase to control the movement of the pistons. The port valve as described above will ensure precise volume flow through the cylinders of the fluid meter.

In certain embodiments, it is preferable that the fluid meter comprises at least one wheel coupled to the crankshaft and has at least one magnetic pole, and at least one sensor to detect the influence of the at least one magnetic pole and to generate a signal corresponding to the flow of the fluid into and from the corresponding cylinders and the crankcase.

Certain embodiments provide a multiple fluid meter assembly comprising at least two fluid meters of the above type. Such an assembly will provide a compact design when multiple fluid meters are required.

In one or more embodiments, it is preferable that at least two fluid meters are arranged such that their alignment axes are parallel. An assembly with parallel fluid meters will typically provide a meter assembly that is very compact. This is often an important criteria in modern fluid dispensers, where many fluid meters are required and the fluid dispenser unit design require the internal equipment to be small.

In one or more embodiments, it is preferable that the fluid inlet and the fluid outlet of one fluid meter communicate with the fluid inlet and the fluid outlet of another fluid meter, respectively, so as to connect the individual fluid meters in parallel.

Certain embodiments provide a fuel dispensing unit for refueling vehicles, comprising a fluid meter or a multiple fluid meter assembly of the types described above. The fluid meter or fluid meter assembly disclosed herein is especially suitable for fuel dispensers due to its reliability and accurate measurement capabilities.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein:

FIG. 1a is an exploded diagram of connecting rods having slotted yokes and a crankshaft having two crank arms of a fluid meter according to the prior art.

FIG. 1b is a perspective view of a mounted assembly of the prior art of FIG. 1a.

FIG. 2a is an exploded diagram of a fluid meter having integral piston/connecting rod parts, a crankshaft having one crank arm, a rotating valve, a magnetic wheel and a transducer according to one embodiment of a fluid meter.

FIG. 2b is a perspective view of a mounted assembly of FIG. 2a.

FIG. 3 is a cross sectional view of the fluid meter taken along the axis of the aligned cylinders, corresponding to the line III of FIG. 2b.

FIG. 4 is a cross sectional view along the line IV in FIG. 3 of the fluid meter.

DETAILED DESCRIPTION OF PREFERRED EMBODIMENTS OF THE INVENTION

Figure 2C:
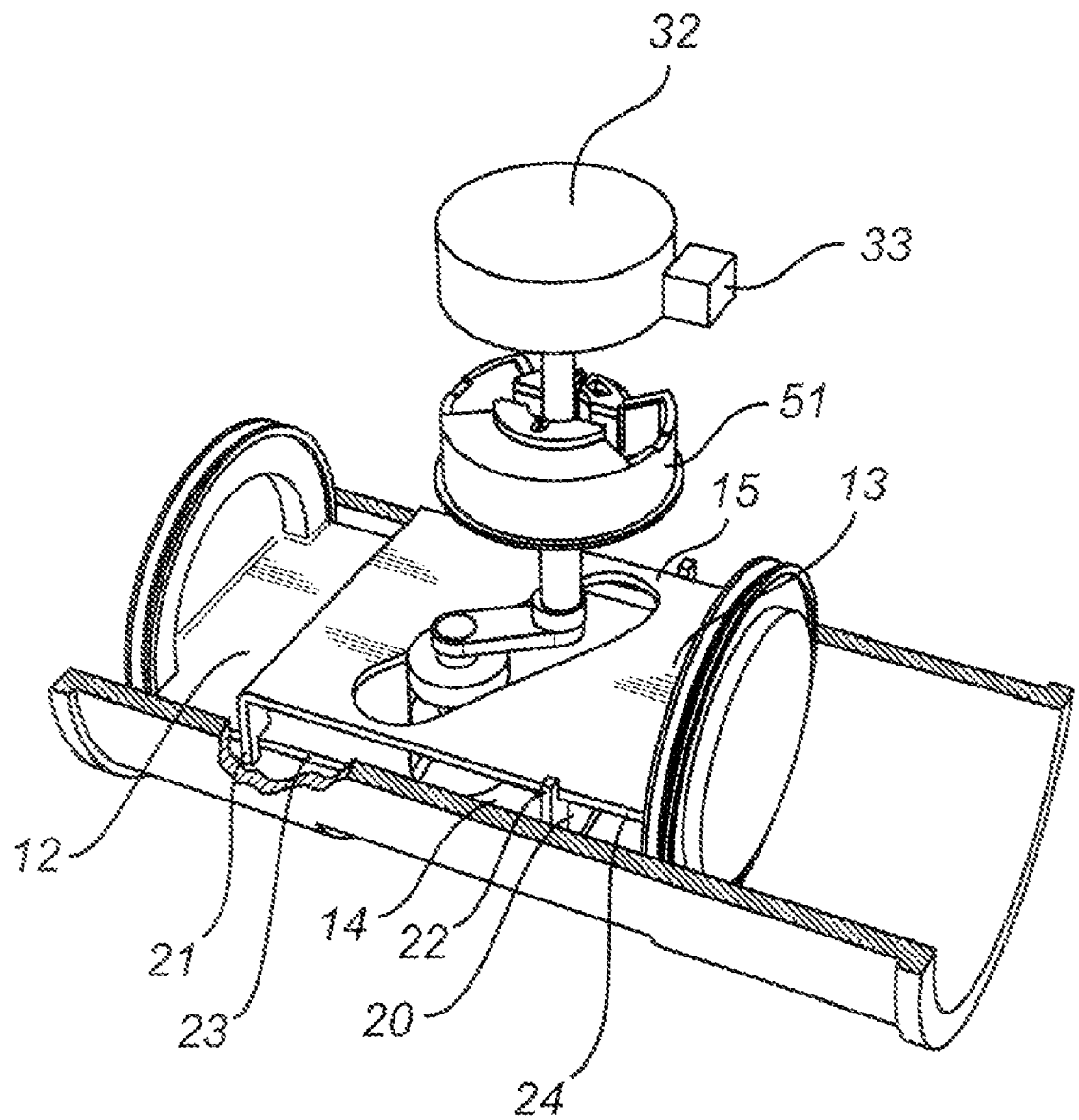
FIG. 2c is a perspective view of a mounted assembly of FIG. 2a showing an embodiment of the connecting rods where these are coupled to each other with guide tabs.

FIGS. 1a and 1b shows a pair of connecting rods, 1, 2, according to the prior art (U.S. Pat. No. 5,686,663 to Spalding et al.), each connected to a piston, 3, 4, as described in the prior art. The connecting rods, 1, 2, have Scotch yoke portions, 5, 6, with oblong yoke slots, 7, 8. The center axes of the yoke slots are perpendicular to the center axes of the connecting rods, 1, 2. To move the connecting rods, 1, 2, and thus also the pistons, 3, 4, with a phase difference of 60°, as described in the prior art of Spalding, the yoke portions, 5, 6, will have to be driven by different crank arms, 9, 10, of the crankshaft, 11 as depicted in FIGS. 1a and 1b.

FIGS. 2a and 2b shows pistons 3, 4 with integrated connecting rods 12, 13 of a preferred embodiment of the present invention, the connecting rods 12, 13, having yoke portions 14, 15, with yoke slots 16, 17. To perform a reciprocating movement of the pistons, 3, 4, using only one crank arm, 18, the center axes of the oblong yokes slots, 16, 17, are each angled 30° compared to the perpendicular direction to the center axes of the connecting rods 1, 2. The combined angle between the center axes of the oblong yoke slots of the two connecting rods, 12, 13, is thus 60°. This arrangement of the yoke slots will invoke the same movement of the connecting rods, 12, 13, and thus also the pistons, 3, 4, as the prior art, i.e., a reciprocating movement of the pistons 60° out of phase, but with the use of only one crank arm, 18, and one crank pin, 19.

FIG. 2c shows a preferred embodiment of the connecting rods, 12, 13, of the present invention. A portion 20 of one connecting rod, 12, engages the other connecting rod, 13, to support and guide the other connecting rod, 13 during movement. Each connecting rod, 12, 13, further has a pair of guide tabs, 21, 22, engaging the opposed side edge portions, 23, 24, of the other connecting rod, 12, 13. By coupling the connecting rods, 12, 13, the connecting rods, 12, 13, are limited to a movement along the center axis of the aligned cylinders, 25, 26. It should, however, be noted that the effect of the connection of the connecting rods, 12, 13, limiting the movement of the connecting rods, 12, 13, could be made in a number of different ways. The rods could, e.g., be guided by guiding rails mounted to the cylinder walls, limiting the movement reciprocating along the cylinder center axes. The same effect could also be achieved by using connecting rods, 12, 13, having any other coupling means to each other or to the cylinders, 25, 26 to limit their movement as described.

The integral components providing the pistons 3, 4 and the connecting rods, 12, 13, of FIG. 2c are preferably molded from plastic, metal, ceramic or a composite material. The connecting rod parts 12, 13 have slotted yokes, 25, 26.

In FIG. 3, the reference numeral 27 designates a flow meter according one embodiment. The flow meter 27 includes a flow meter body 28 having a crankcase portion 29 (indicated by the broken lines) and opposing, axially aligned, first and second cylinder portions, 25 and 26, respectively, extending outwardly from the crankcase (from the broken lines). The head ends of the cylinder portions 25 and 26 are capped by first and second head end cover plates 30 and 31, respectively.

A magnetic wheel 32 is connected to the crankshaft 11 at the center of the magnetic wheel 32. A series of magnetic poles (not shown) are incorporated in the magnetic wheel 32 angularly spaced about the outer circumference of the wheel 32.

A Hall effect transducer 33 having two sensors, well known in the art, is mounted within close proximity to the magnetic wheel 32. Due to the proximity of the sensors to the wheel 32, the sensors can detect fluctuations in the magnetic influence of the magnetic poles of the wheel 32 when the wheel 32 rotates. In response to such detection, the transducer 33 generates a pulsed signal proportional to the rate of rotation of the wheel 32. The two sensors are, furthermore, horizontally spaced so that the direction of rotation of the magnetic wheel 32 can be determined by identifying which of the two sensors first detects the magnetic influence of a particular pole.

A ball bearing assembly 34 is fitted in a small bore 35 in the meter body 28. A crankshaft 11 is rotatably disposed in the bearing assembly 34. The crankshaft 11 has a vertical orientation bearing laterally against the bearing assembly 34. The upper portion of the crankshaft 11 extends above the bearing assembly 34 and is shaped to receive a rotary valve more thoroughly discussed with reference to FIGS. 5 and 6 below. A crank arm 18 is connected to the lower portion of the crankshaft 11 and extends radially outwardly from the crankshaft. A crankpin 19 extends downwardly from the radially outer part of the crank arm 18 through a first roller bearing 36 and a second roller bearing 37, the second roller bearing 37 being located below the first roller bearing 36.

Referring to FIG. 3, the flow meter 27, as shown, further includes first and second pistons 3, 4, disposed in the cylinders 25 and 26, respectively. First and second connecting rods, 12, 13, integrally connected to the pistons 3, 4, drivingly connect the respective pistons 19, 20, to the respective first and second roller bearings, 36, 37. The integrally made piston/connecting rod parts 3, 12 and 4, 13, respectively, are hence connected to the crankshaft via the roller bearings, 36, 37. The connecting rods 12, 13 are more clearly shown in FIGS. 2a and 2b. As mentioned earlier, the integral components providing the pistons 3, 4 and the connecting rods, 12, 13, are preferably molded from plastic, metal, ceramic or a composite material The connecting rods 12, 13, are provided with oblong slotted yokes, 16, 17 for slidingly engaging the respective first and second roller bearings, 36, 37. The oblong slotted yokes, 16, 17 do in this embodiment have straight central axes with an angle of 60° between the respective center axis. The first and second slotted yokes 16, 17, have center axes with angles of 120° and 60°, respectively, to the center axis of the axially aligned first and second cylinder portions 25 and 26.

Referring to the embodiment shown in FIG. 3, the pistons 3, 4, have circular recesses, 38, 39, for receiving gaskets (not shown). The gaskets are made of a resilient material to seal the cylinder head chambers 40 and 41 from the crankcase chamber 42 defined by the crankcase portion 29 and the parts of the cylinder portions 25, 26 that are on the inner sides (facing the crankcase) of the pistons 3 and 4. The two pistons 3, 4, thus divides the cylinder volumes combined with the crank case portion volume in three chambers, sealed from each other, the head chambers 40, 41 and the crankcase chamber 42.

Figure 6:
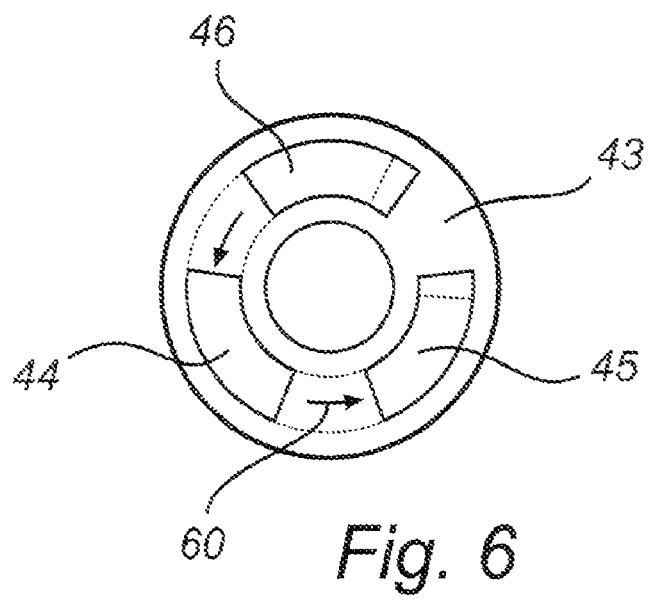
FIG. 6 is a plan view showing the ports of a rotary valve superimposed over a valve seat of the fluid meter in FIG. 3.

FIG. 6 shows a valve seat 43 as seen from the top of the flow meter 27 of FIG. 3. The valve seat 43 includes first, second and third arcuate ports, 44, 45, 46, which each cover an arc about the crankshaft bore 47 of approximately 80° and are angularly spaced apart approximately 40° between ports. Referring to both FIGS. 3 and 6 the first port 44 is in fluid communication with the first head end chamber 40 via a first passageway 48 formed in the fluid meter body 28. The second port 45 is in fluid communication with the second head end chamber 41 via a second passageway 49 formed in the fluid meter body 28. Referring to FIGS. 6 and 4, the third port 46 is in fluid communication with the crankcase chamber 42 via a third passageway 50 formed in the fluid meter body 28.

Figure 5A:
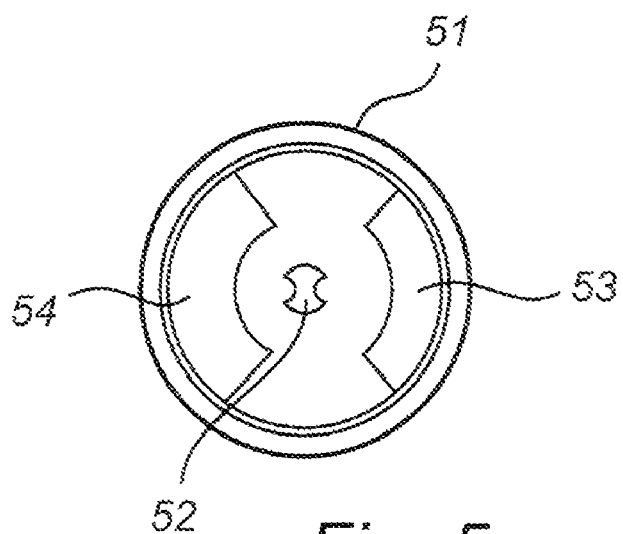
FIG. 5a is a top view of the rotary valve of the fluid meter.
Figure 5B:
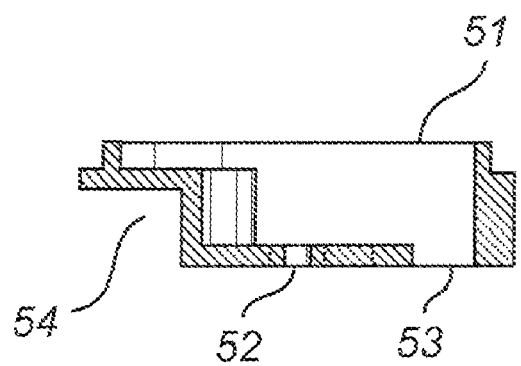
FIG. 5b is a cross sectional view of the rotary valve of the fluid meter.

Referring to FIG. 5a, a rotary valve 51 is positioned on top of the valve seat 43 to control the admission and discharge of a fluid into and out of the first, second, and third ports 44, 45, 46. The rotary valve 51, with reference to FIGS. 5a and 5b, includes a hole 52 formed in the center thereof through which the crankshaft 11 extends for rotatably coupling the valve 51 to the crankshaft 11. Referring to FIGS. 5 and 6, the rotary valve 51 further includes an arcuate inlet port 53 and an arcuate outlet port 54 axially and radially aligned to alternately register with the first, second, and third arcuate ports 44, 45, 46 of the valve seat 43 when the valve 51 is rotated by the crankshaft 11 The ports 53, 54 each cover an arc about the hole 52 of approximately 100° and are angularly spaced apart approximately 80° between ports.

As further shown in FIGS. 3 and 4, a mounting flange (or meter dome) 55 is secured to the top of the flow meter body 28. A supply chamber 56 is formed in the flange for supplying fluid to the inlet port 53 of the rotary valve 51. A supply port 57 formed in the flange provides fluid communication between the supply chamber 56 and fluid supply lines (not shown). Similarly, an annular discharge chamber 58 is formed in the flange 55 for receiving fluid discharged from the outlet port 54 of the rotary valve 51. A discharge port 59 provides fluid communication between the discharge chamber 58 and fluid discharge lines (not shown).

FIG. 6 further depicts one instantaneous position of the rotary valve ports 53, 54 (shown in phantom) superimposed over the first, second, and third ports 44, 45, 46 of the valve seat 43. In operation, the rotary valve 51 is rotated by the crankshaft 11 in a counterclockwise direction as indicated by the arrow 60. Accordingly, the inlet and outlet ports 53, 54 sequentially register with each of the ports 44, 45, 46. As shown in FIG. 6, the inlet port 53 is registered with the third port 46 and the outlet port 54 is registered with the second port 45. Registration of the inlet port 53 with the first port 44 is depicted as impending. Because each of the ports 44, 45, 46 cover an angle of approximately 80° and each of the rotary valve ports 53, 54 cover an angle of approximately 100°, each port 44, 45, 46 alternately registers with the inlet port 53 for 180° of rotation of the crankshaft 1 and then with the outlet port 54 for 180° of rotation. It can be appreciated that the inlet port 53 or the outlet port 54 may register with one or two, but not all three, of the ports 44, 45, 46 simultaneously. The ports 44, 45, 46 may, however, register with only one of the ports 53, 54 at a time.

To more fully illustrate the operation of the flow meter 27, and with reference to FIG. 3, it will be assumed that, initially, the flow meter body 28 is filled with fluid, the crankshaft 11 is rotated to place the first piston 3 in as close proximity to the head cover 30 as possible (i.e., a "top dead center" position), the second piston 4 leads the first piston 3 by a phase angle of 60°, and the rotary valve ports 53, 54 are related to the first, second, and third ports 44, 45, 46 as shown in FIG. 6. A fluid, such as gasoline from an external source (not shown), is then supplied through the supply port 57 and passed through the supply chamber 56, the inlet port 53 of the rotary valve 51, and, in accordance with FIG. 6, through the third port 46. The fluid then flows through the third passageway 50 (FIG. 4) and into the crankcase chamber 42 where it applies pressure to displace the second piston 4 outwardly (away from the crankshaft 11). The first piston 3 resists outward movement since it is in a top dead center position. The outward movement of the second piston 4 expels fluid from the second chamber 41 thereby causing the fluid to pass through the second passageway 49, the outlet port 54 of the rotary valve 51, the discharge chamber 58, and out through the discharge port to 59 to a discharge line (not shown). The movement of the second piston 4 also drives the crankshaft 11 via the second connecting rod 13. Accordingly, the crankshaft 11 imparts counter clockwise rotation to the rotary valve 51 and the inlet port 53 begins to register with the first port 44. Fluid in the supply chamber 48 then begins to flow through the inlet port 53 of the rotary valve 51 and through the first port 44. The fluid then flows through the first passageway 48 into the first chamber 40 and applies pressure to displace the first piston 3 inwardly (towards the crankshaft 11), thereby effecting further rotation of the crankshaft 11 and the rotary valve 51. The process continues according the principles described herein. As a result, the pistons 3, 4 reciprocate in the cylinders 25, 26, respectively, thereby rotating the crankshaft 11, the attached rotary valve 51, and the magnetic wheel 32. The sensors in the Hall effect transducer 33 detect the consequent fluctuation in the magnetic influence of the magnetic poles on the wheel 32 and generate a pulsed signal which is proportional to the flow rate of the fluid passing through the flow meter 27. Although not clear from the drawings, it is understood that the pulsed signal may be employed to drive an electronic counter and indicator for recording the volume and total value of fluid, such as gasoline, dispensed through the flow meter 27.

The inlet and outlet ports 53, 54 of the rotary valve 51 and the ports 44, 45, 46 cooperate such that the volume of fluid admitted to, or withdrawn from, the crankcase chamber 42 is equal to the algebraic sum of the volume respectively withdrawn from, or admitted to, the head end chambers 40, 41. Thus the crankcase chamber 42 provides what may be termed a "blind" or "hypothetical" piston and cylinder, mechanically and hydraulically cooperating with the pistons 3, 4 which are structurally existent. Thus the meter operates hydraulically and mechanically like a three piston meter or hydraulic motor although it only has the physical components of a two piston meter or motor. It should be noted that the flow into and out of the flow meter 27 is substantially constant. This constant flow results from reciprocating the axially-aligned pistons 3, 4 60° out of phase and from utilizing yokes 16, 17 as described above, which are substantially harmonic in conformity with Scotch Yokes.

Thus, as a result of all of the foregoing, the fluid meter of the present invention is compact, yet cost-efficient and mechanically efficient.

It is understood that the yoke slots of the invention, could have other shapes. The yokes could, e.g., be curved to accomplish a perfect sine function movement or any modification of a periodic sine function.

It is further understood that having angled yoke slots 16, 17 is a preferred embodiment. The invention also comprises using slots that are perpendicular to the alignment axis of the two cylinders, as in the prior art of Spalding.

Figure 7:
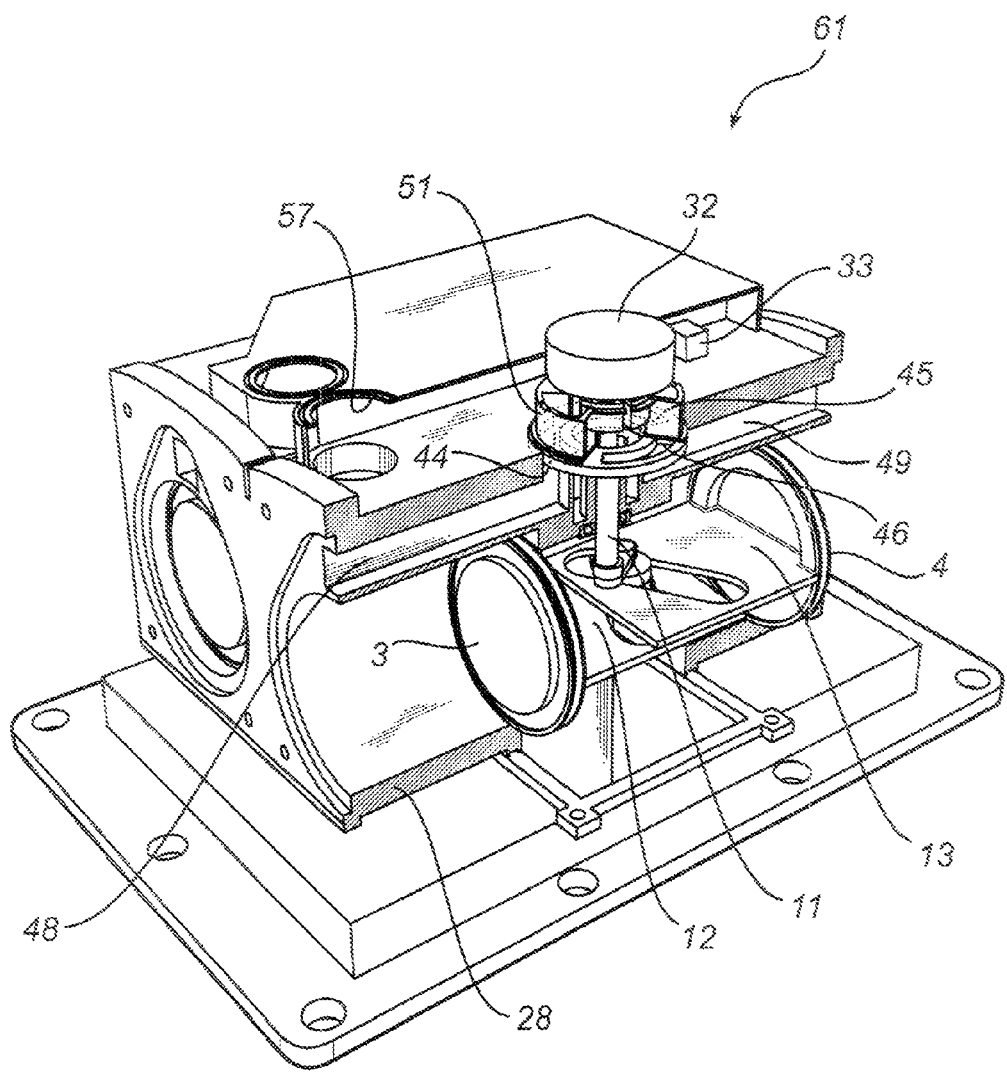
FIG. 7 is an isometric view of a unitary assembly incorporating two fluid meters similar to the meter of FIGS. 1-6.

It is further understood that multiple flow meters 27 may be integrated into a single assembly to gain several advantages over the single flow meter described hereinabove. For example, a duplex flow meter assembly 61 wherein two fluid meters 27, as depicted in FIG. 7, are integrated together, would facilitate the construction of gasoline dispenser pump stations having two, four, six, or eight gasoline dispensers. Furthermore, a duplex flow meter 61 would only require a single meter body, meter dome, and end cover, thereby economizing on manufacturing costs. Installation of duplex flow meters 61 is facilitated as a result of simplified mounting and pipe work and the reduced cabinet size required to house a duplex fluid meter. Flexibility is also enhanced because a duplex flow meter could also serve a single hose outlet at twice the speed of delivery of a single unit flow meter.

It is further understood that the ports 44, 45, 46, 53, 54 may cover arcs of a number of different angles and, moreover, may have non-arcuate shapes.

It is still further understood that the supply port and the discharge port may instead be utilized as discharge and supply ports respectively. Furthermore, the supply and discharge lines connected thereto may be arranged for measuring the volume of any fluid that flows through any line. For example, in addition to measuring a fluid, such as gasoline, that flows from a dispenser, the meter could be used to measure the volume of water flowing from a pipe into a structure such as a residential house or other building.

It is understood that other variations in the present invention are contemplated and in some instances, some features of the invention can be employed without a corresponding use of other features. Accordingly, it is appropriate that the appended claims be construed broadly in a manner consistent with the scope of the invention.

The invention claimed is:

1. A fluid meter comprising:
a housing defining at least one crankcase and two cylinders;
a crankshaft disposed in the crankcase;
two pistons respectively mounted in the cylinders for reciprocal movement;
a first connecting rod integral with one of the pistons and connected to the crankshaft for rotating the crankshaft in response to the movement of the one piston; and
a second connecting rod integral with the other piston and connected to the crankshaft for rotating the crankshaft in response to the movement of the other piston, wherein the first and second connecting rods have yoke slots for receiving a crank pin.

2. A fluid meter according to claim 1, wherein the integral rods and pistons are made of a material selected from the group consisting of: plastic, metal, ceramic, and composite materials.

3. A fluid meter according to claim 1, wherein the integral rods and pistons are molded.

4. A fluid meter according to claim 1, wherein:
the connecting rods are connected to the crankshaft by one common crank pin that is radially offset from the crankshaft,
the two cylinders are axially-aligned,
an axis through the endpoints of the yoke slot of one connecting rod forms an angle alpha with the alignment axis of the two axially aligned cylinders,
an axis through the endpoints of the yoke slot of the other connecting rod forms another, different angle beta with said alignment axis, so that the corresponding pistons reciprocate out of phase.

5. A fluid meter according to claim 1, wherein each one of the yoke slots of said two connecting rods is adapted to extend along a straight line between said endpoints.

6. A fluid meter according to claim 4, wherein said angles alpha and beta are chosen so that the pistons reciprocate approximately 60° out of phase.

7. A fluid meter according to claim 5, wherein said angles alpha and beta are chosen so that the pistons reciprocate approximately 60° out of phase.

8. A fluid meter according to claim 4, wherein alpha is less than 90° and beta is more than 90°.

9. A fluid meter according to claim 4, wherein alpha is approximately 60° and beta is approximately 120°.

10. A fluid meter according to claim 1, wherein a portion of one connecting rod engages the other connecting rod to support and guide the other connecting rod during movement.

11. A fluid meter according to claim 10, wherein each connecting rod has a pair of guide tabs engaging the opposed side edge of the other connecting rod.

12. A fluid meter according to claim 1, wherein ports are defined in the housing in communication with the cylinders and the crankcase, and further comprising a port valve mounted on the crankshaft for rotation therewith and having a plurality of ports for sequentially registering with the ports in the housing for distributing fluid into and from the cylinders and the crankcase to control the movement of the pistons.

13. A fluid meter according to claim 1, further comprising at least one wheel coupled to the crankshaft and having at least one magnetic pole, and at least one sensor to detect the influence of the at least one magnetic pole and to generate a signal corresponding to the flow of the fluid into and from the corresponding cylinders and the crankcase.

14. A multiple fluid meter assembly comprising two fluid meters, each such fluid meter comprising:
a housing defining at least one crankcase and two cylinders;
a crankshaft disposed in the crankcase;
two pistons respectively mounted in the cylinders for reciprocal movement;
a first connecting rod integral with one of the pistons and connected to the crankshaft for rotating the crankshaft in response to the movement of the one piston; and
a second connecting rod integral with the other piston and connected to the crankshaft for rotating the crankshaft in response to the movement of the other piston, wherein the first and second connecting rods have yoke slots for receiving a crank pin.

15. A multiple fluid meter assembly according to claim 14, wherein the two fluid meters are arranged such that their alignment axes are parallel.

16. A fuel dispensing unit for refueling vehicles, comprising:
- a nozzle for dispensing fuel;
- a display; and
- a fluid meter comprising:
  - a housing defining at least one crankcase and two cylinders;
  - a crankshaft disposed in the crankcase;
  - two pistons respectively mounted in the cylinders for reciprocal movement;
  - a first connecting rod integral with one of the pistons and connected to the crankshaft for rotating the crankshaft in response to the movement of the one piston; and
  - a second connecting rod integral with the other piston and connected to the crankshaft for rotating the crankshaft in response to the movement of the other piston, wherein the first and second connecting rods have yoke slots for receiving a crank pin.

17. The fuel dispensing unit for refueling vehicles according to claim 16, wherein
- the connecting rods are connected to the crankshaft by one common crank pin that is radially offset from the crankshaft,
- the two cylinders are axially-aligned,
- an axis through the endpoints of the yoke slot of one connecting rod forms an angle alpha with the alignment axis of the two axially aligned cylinders,
- an axis through the endpoints of the yoke slot of the other connecting rod forms another, different angle beta with said alignment axis, so that the corresponding pistons reciprocate out of phase.

18. The fuel dispensing unit for refueling vehicles according to claim 16, wherein each one of the yoke slots of said two connecting rods is adapted to extend along a straight line between said endpoints.

19. The fuel dispensing unit for refueling vehicles according to claim 18, wherein said angles alpha and beta are chosen so that the pistons reciprocate approximately 60° out of phase.

20. The fuel dispensing unit for refueling vehicles according to claim 17, wherein alpha is less than 90° and beta is more than 90°.

21. The fuel dispensing unit for refueling vehicles according to claim 17, wherein alpha is approximately 60° and beta is approximately 120°.

22. A system comprising:
- a first cylinder and a second cylinder that are axially-aligned; and
- a first connecting rod connected to the first cylinder, the first connecting rod having a yoke slot, the yoke slot of the first connecting rod having an axis through each endpoint along the length of the yoke slot forming an angle alpha with an axis along the length of the first connecting rod, wherein the angle alpha is one of less than 90 degrees or greater than 90 degrees.

23. The system of claim 22, wherein the first connecting rod is connected to a second connecting rod by one common crank pin that is radially offset from a crankshaft.

24. The system of claim 22, further comprising a second connecting rod that is connected to the second cylinder.

25. The system of claim 23, wherein a portion of the first connecting rod engages the second connecting rod to support and guide the second connecting rod during movement.

26. The system of claim 23, wherein the second connecting rod has a yoke slot that forms an angle beta, the angle beta created between an axis through each endpoint along the length of the yoke slot of the second connecting rod and an axis along an alignment axis of the axially aligned first and second cylinder, wherein the angle beta allows a first piston that is integral with the first connection rod and connected to the first cylinder, and a second piston connected to the second cylinder to reciprocate movement out of phase.

27. The system of claim 26, wherein the angle alpha and the angle beta are configured so that the pistons reciprocate approximately 60° out of phase.

28. The system of claim 22, wherein the angle alpha is approximately 30°.

* * * * *